US008144617B2

(12) United States Patent
Watanabe

(10) Patent No.: US 8,144,617 B2
(45) Date of Patent: Mar. 27, 2012

(54) PACKET TRANSFER ARRANGEMENTS VARYING TRANSFER PERFORMANCE BASED ON NUMBER OF GROUP JOINING MESSAGES

(75) Inventor: Rinne Watanabe, Yokohama (JP)

(73) Assignee: ALAXALA Networks Corporation, Kanagawa (JP)

( * ) Notice: Subject to any disclaimer, the term of this patent is extended or adjusted under 35 U.S.C. 154(b) by 184 days.

(21) Appl. No.: 12/486,856

(22) Filed: Jun. 18, 2009

(65) Prior Publication Data
US 2010/0067527 A1    Mar. 18, 2010

(30) Foreign Application Priority Data
Sep. 12, 2008    (JP) ................................. 2008-234192

(51) Int. Cl.
H04L 12/26    (2006.01)
G06F 15/173    (2006.01)
(52) U.S. Cl. ........................................ 370/253; 709/226
(58) Field of Classification Search ........................ None
See application file for complete search history.

(56) References Cited

U.S. PATENT DOCUMENTS

| 7,362,776 B2 * | 4/2008 | Meier et al. ................... 370/468 |
| 7,944,826 B2 * | 5/2011 | Wang ............................. 370/230 |
| 2003/0157966 A1 * | 8/2003 | Sato et al. ....................... 455/561 |
| 2005/0254444 A1 * | 11/2005 | Meier et al. ................... 370/312 |
| 2007/0165633 A1 * | 7/2007 | Ikegami et al. ............... 370/390 |
| 2009/0022064 A1 * | 1/2009 | Oron et al. .................... 370/253 |
| 2009/0238200 A1 * | 9/2009 | Melsen et al. ................ 370/431 |
| 2010/0316050 A1 * | 12/2010 | Baykal et al. ................ 370/390 |
| 2011/0019578 A1 * | 1/2011 | Berg et al. .................... 370/252 |

OTHER PUBLICATIONS

"AX6700S/AX6300S Software Manual Configuration Settings, vol. 1", ALAXALA Networks Corporation, Nov. 2006, pp. 181-182.
Ken Christensen, "Rapid PHY Selection (RPS): A Performance Evaluation of Control Policies", Jan. 2007, http://grouper.ieee.org/groups/802/3/eee_study/public/jan07/christensen_01_0107.pdf.
Cain et al., "Internet Group management Protocaol, Version 3" IETF RFC3376, Oct. 2002.
Vida et al., "Multicast Listner Discovery Version 2 (MLDv2) for IPv6", IETF RF3810, Jun. 2004.
Fenner et al, "Protocol Independent Multicast—Sparse Mode (PIM-SM): Protocol Specification (Revised)", IETF RF4601, Feb. 2006.

* cited by examiner

*Primary Examiner* — Ayaz Sheikh
*Assistant Examiner* — Timothy J Weidner
(74) *Attorney, Agent, or Firm* — Antonelli, Terry, Stout & Kraus, LLP.

(57) ABSTRACT

A router stands by in a power saving state when there is no multicast joining message received. The router increases transfer performance with granularity such as the bandwidth of each multicast channel or the maximum bandwidth of each receiving line when a multicast joining message is received. On the other hand, the router decreases transfer performance with granularity such as the bandwidth of each multicast channel or the maximum bandwidth of each receiving line when a multicast disjoining message is received. The aforementioned processing permits achievement of power saving in the router connected to a multicast network.

8 Claims, 14 Drawing Sheets

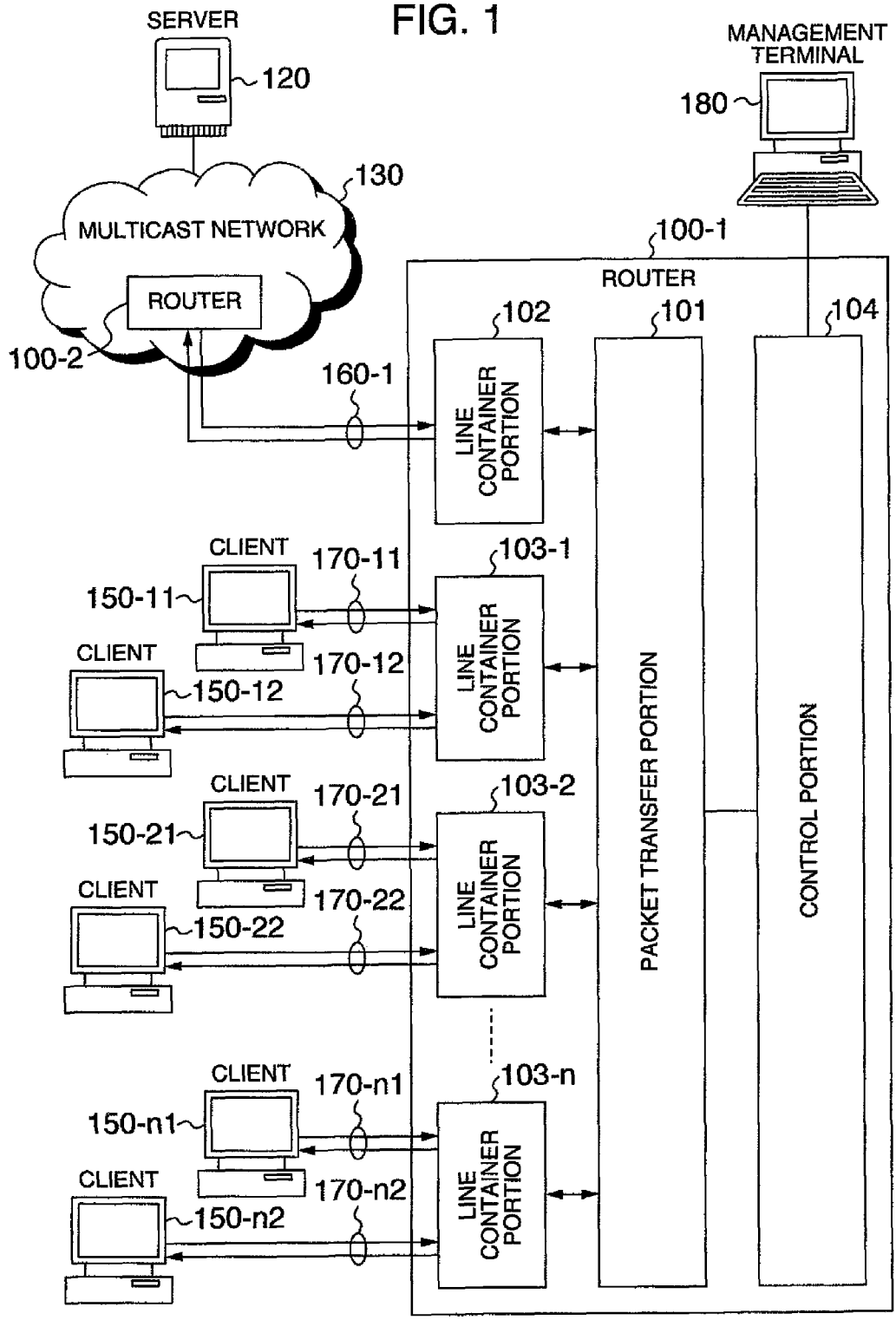

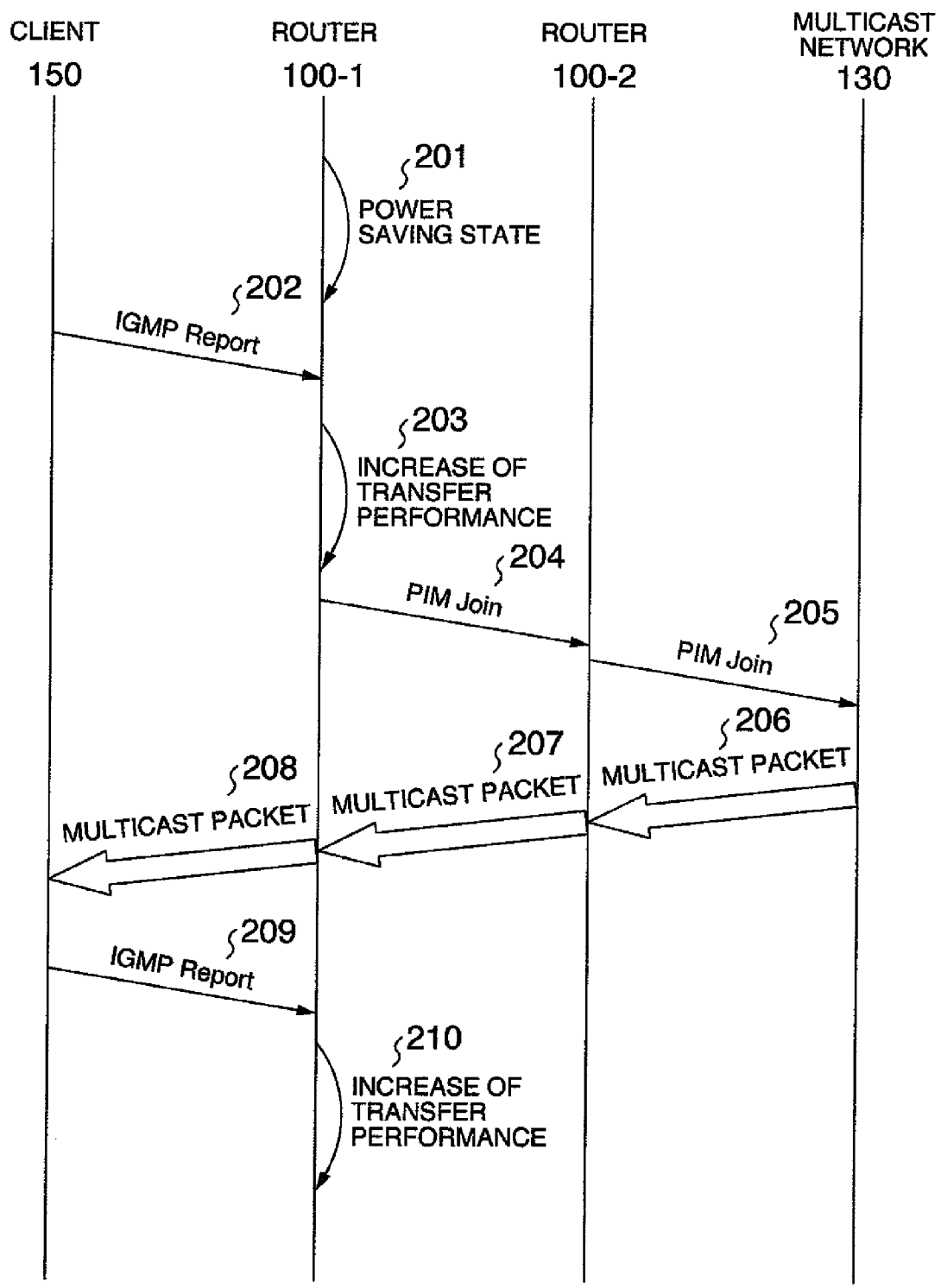

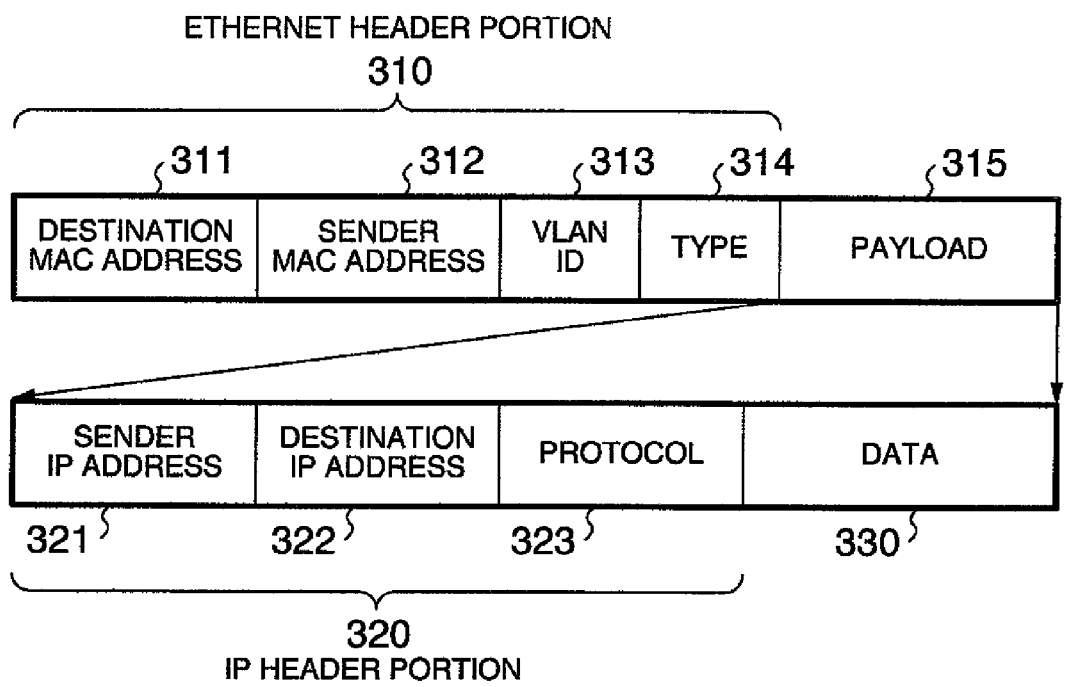
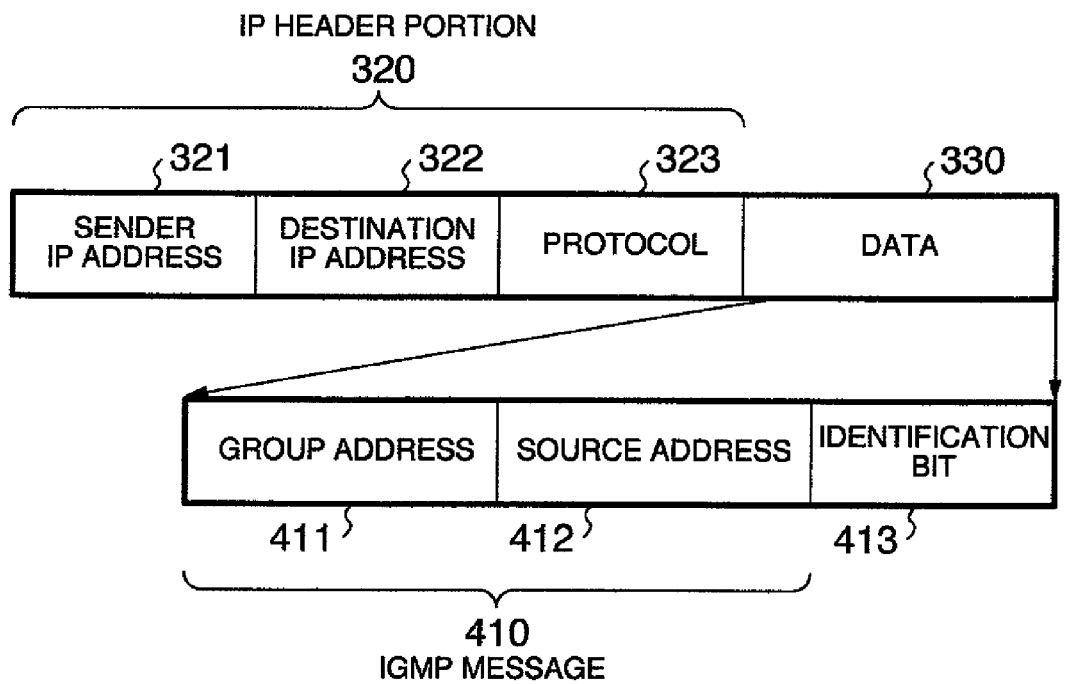

FIG. 9

| 901 SENDER IP ADDRESS | 902 DESTINATION IP ADDRESS | 903-1 OUTPUT LINE NUMBER | 903-2 OUTPUT LINE NUMBER | | 903-n OUTPUT LINE NUMBER |
|---|---|---|---|---|---|
| 10.0.0.1 | 244.1.1.1 | 170-21 | 170-31 | -------- | — |
| -------- | — | — | — | -------- | -------- |
| — | — | — | — | -------- | — |

900 ROUTING TABLE (CONTROL PORTION)
812 ROUTING TABLE (PACKET TRANSFER PORTION)

FIG. 11

1100 BANDWIDTH MANAGEMENT TABLE

| SENDER IP ADDRESS (1101) | DESTINATION IP ADDRESS (1102) | BANDWIDTH (Mbps) (1103) | NUMBER OF RECEPTIONS (1104) |
|---|---|---|---|
| 10.0.0.1 | 244.1.1.1 | 50 | 2 |
| – | – | – | – |
| ⋮ | ⋮ | ⋮ | ⋮ |
| – | – | – | – |

FIG. 12

1200 LINE BANDWIDTH MANAGEMENT TABLE

| | LINE NUMBER (1201) | BANDWIDTH (Mbps) (1202) | NUMBER OF RECEPTIONS (1203) |
|---|---|---|---|
| 1 | 170-21 | 1000 | 1 |
| 2 | 170-31 | 1000 | 0 |
| ⋮ | ⋮ | ⋮ | ⋮ |

FIG. 13

1300 LINE CONTAINER PORTION BANDWIDTH MANAGEMENT TABLE

| | LINE CONTAINER PORTION NUMBER (1301) | BANDWIDTH (Mbps) (1302) | NUMBER OF RECEPTIONS (1303) |
|---|---|---|---|
| 1 | 103-1 | 2000 | 12 |
| 2 | 103-3 | 2000 | 2 |
| ⋮ | ⋮ | ⋮ | ⋮ |

FIG. 14

1400 QoS BANDWIDTH MANAGEMENT TABLE

| | QUEUE NUMBER (1401) | BANDWIDTH (Mbps) (1402) | NUMBER OF RECEPTIONS (1403) |
|---|---|---|---|
| 1 | 10 | 20 | 1 |
| 2 | 15 | 30 | 1 |
| ⋮ | ⋮ | ⋮ | ⋮ |

FIG. 15 config# multicast_power_saving_mode igmp channel_bandwidth
~ 1501 config# multicast_power_saving_mode igmp line_bandwidth
~ 1502 config# multicast_power_saving_mode igmp nif_bandwidth
~ 1503 config# multicast_power_saving_mode igmp qos_bandwidth
~ 1504 config# multicast_power_saving_mode mld channel_bandwidth
~ 1505 config# multicast_power_saving_mode pim channel_bandwidth
~ 1506

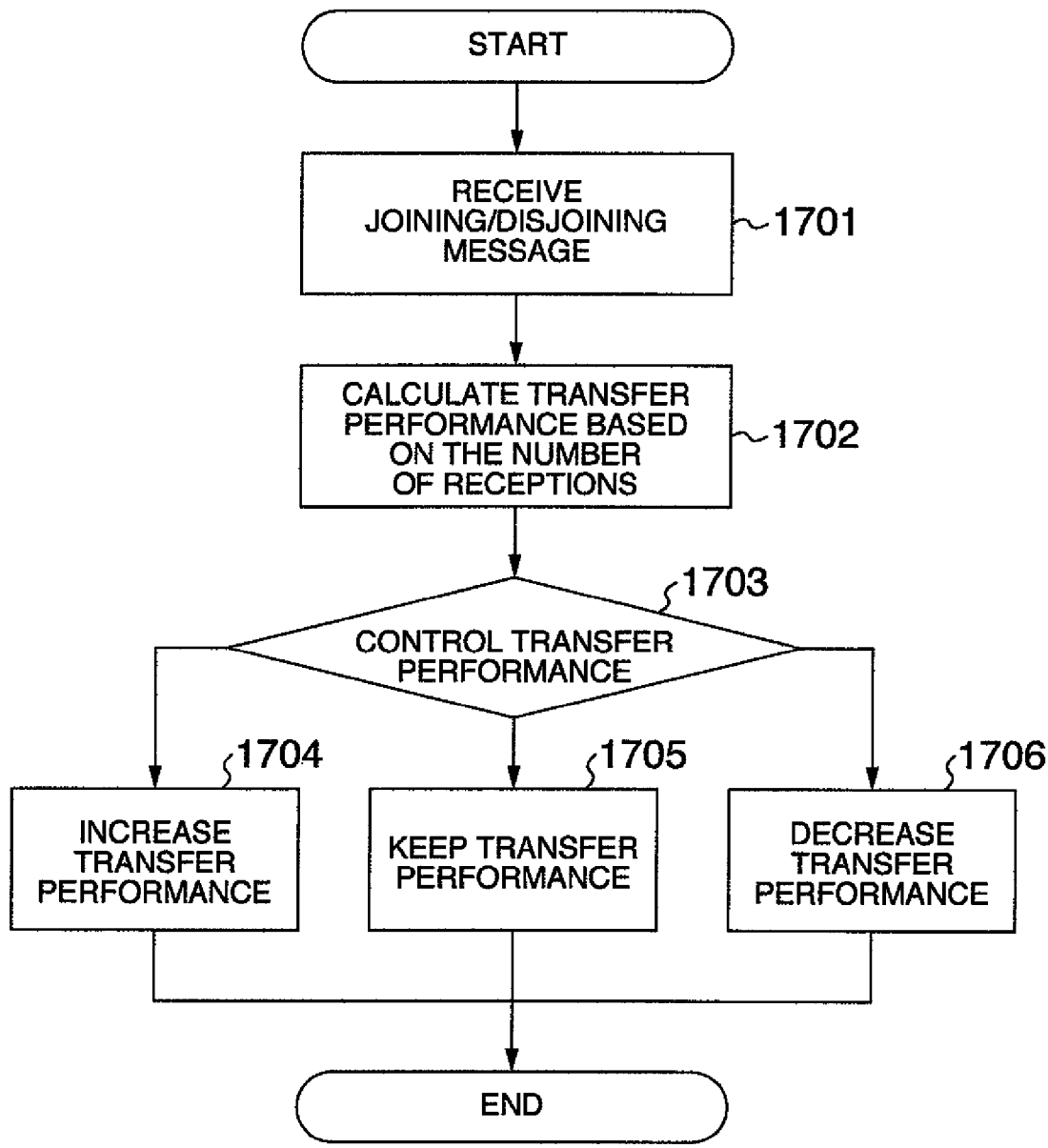

PACKET TRANSFER ARRANGEMENTS VARYING TRANSFER PERFORMANCE BASED ON NUMBER OF GROUP JOINING MESSAGES

INCORPORATION BY REFERENCE

The present application claims priority from Japanese application JP 2008-234192 filed on Sep. 12, 2008, the content of which is hereby incorporated by reference into this application.

BACKGROUND OF THE INVENTION

1. Field of the Invention

The present invention relates to a packet transfer apparatus and particularly relates to a technique for achieving power saving in a packet transfer apparatus which transfers multicast packets.

2. Description of the Related Art

The number of IP routers (hereinafter referred to as routers) provided in carrier networks and corporate networks has increased rapidly with the popularization of the Internet, the accelerated adoption of IP technology in landline telephones and the accelerated adoption of IP technology in corporate networks. The performances of the routers for transferring traffic have been improved as the amount of network traffic has gone on increasing. Routers' power consumption has increased year by year with the popularization of the routers and improvement of the routers' performances. Techniques for reducing routers' power consumption have been developed in response to recent ecological issues, etc.

A method of reducing the clock frequency or power supply voltage in a packet transfer portion of a router to reduce transfer performance is one of techniques for reducing power consumption. For example, a power control function and a power-off function have been described in "AX6700S/AX6300S Software Manual Configuration Settings, Vol.1", ALAXALA Networks Corporation, November 2006, pp. 181-182. According to these functions, packet relaying performance can be reduced or power supply to unused modules can be stopped to reduce router's power consumption when the amount of traffic is small.

A method of changing the speed of a network interface according to the amount of traffic is another technique for reducing power consumption. An example of this technique has been described in "Rapid PHY Selection (RPS): A Performance Evaluation of Control Policies", Ken Christensen, January 2007. The speed of a PHY (physical chip) in an Ethernet (registered trademark) interface can be changed according to the amount of traffic to thereby reduce power consumption.

On the other hand, use of IP multicast has advanced to achieve contents distribution such as video distribution to a plurality of receivers on an IP network. In IP multicast, contents are transmitted to a group. A client which wishes to receive contents transmits a message for joining the group to an upstream router near a server which distributes the contents. Upon reception of the joining message from the client, the router transmits the group joining message to an upstream router nearer to the distribution server to start reception of multicast packets from the upstream router. The router transmits the received multicast packets to the client, so that the client can start reception of the multicast packets (contents).

On the other hand, when the client has no need to receive contents, the client can terminate contents reception by transmitting a group disjoining message to the upstream router. Upon reception of the disjoining message, the router can stop multicast packet transfer to the client. When there is no client wishing to receive contents under the router, the router can stop multicast packet reception by transmitting a multicast disjoining message to the upstream router.

The present router stands by while always holding the maximum transfer capability to perform multicast packet transfer regardless of whether a multicast joining message is received or not. This is because the router does not know when a client transmits a multicast joining message.

The specification of joining and disjoining messages exchanged as router-client messages in an IPv4 network has been defined as a protocol called IGMPv3 in IETF RFC3376, Internet Group Management Protocol, Version 3. The specification of the messages defined in this protocol has been described chiefly in "5. Description of the Protocol for Group Members" and "6. Description of the Protocol for Multicast Routers".

The specification of disjoining/joining messages in an IPv6 network has been defined as a protocol called MLDv2 in IETF RF3810, Multicast Listener Discovery Version 2 (MLDv2) for IPv6. The specification of the messages defined in this protocol has been described chiefly in "6. Protocol Description for Multicast Address Listeners" and "7. Protocol Description for Multicast Routers".

The specification of joining/disjoining messages exchanged as router-router messages has been defined as a protocol called PIM-SM in IETF RFC4601, Protocol Independent Multicast—Sparse Mode (PIM-SM): Protocol Specification (Revised).

As described in the background art, a router in a multicast network receives a group joining message from a client or a downstream router and transmits the group joining message to an upstream router before the router starts multicast packet transfer. On the other hand, the router stands by while holding 100% transfer capability even in a state in which there is no group joining message received from a client, that is, in a state in which multicast packet transfer is stopped. That is, the router in a standby state consumes electric power not lower than electric power necessary for traffic transfer.

If the transfer capability or interface speed of the router is reduced in accordance with the amount of traffic input/output to/from the router when traffic transfer is stopped or when the amount of transfer is small, power saving can be achieved. It is however difficult to predict the amount of traffic flowing in a network because the amount of traffic generally changes temporally and has bursting characteristic. It is therefore necessary to perform transfer performance control in accordance with the amount of traffic in order to achieve power saving in the router.

In the method of controlling the packet transfer performance of the packet transfer portion as described in "AX6700/AX6300S Software Manual Configuration Settings, Vol. 1", ALAXALA Networks Corporation, November 2006, pp. 181-182, the administrator of the apparatus enters commands into the router based on statistic information to control transfer performance. For this reason, it is difficult to control transfer performance meticulously following the amount of traffic.

In the method of changing the speed of PHY (physical chip) of the Ethernet (registered trademark) interface as described in "Rapid PHY Selection (RPS): A Performance Elevation of Control Policies", Ken Christensen, January 2007, the duty factor of the buffer is described as an example of a turning point for changing the speed. In this case, when burst traffic occurs, packet loss is produced at the time of changing from a low-speed PHY to a high-speed PHY if the quantity of the buffer is too small.

Incidentally, in either "AX6700/AX6300S Software Manual Configuration Settings, Vol.1", ALAXALA Networks Corporation, November 2006, pp.181-182, or "Rapid PHY Selection (RPS): A Performance Elevation of Control Policies", Ken Christensen, January 2007, there is no description about electric power control interlocked with multicast joining messages.

SUMMARY OF THE INVENTION

An object of the present invention is to provide a router in a multicast network with attention paid to the characteristic of multicast communication to solve at least one of the aforementioned problems so that the router is interlocked with a multicast joining message to thereby perform transfer performance control according to the amount of traffic to achieve power saving in the router.

To solve at least one of the aforementioned problems, the invention provides a packet relay apparatus including: line container portions each of which contains lines; and a packet transfer portion which performs transfer processing of a multicast packet; wherein the number of received multicast group joining messages transmitted from a client or another packet relay apparatus connected via a network is counted so that transfer performance of the packet transfer portion is controlled based on the number of receptions.

According to the invention, transfer performance can be controlled based on the number of received multicast group joining messages to thereby achieve power saving in a router.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing the schematic configuration of a router 100-1 and a multicast network in an embodiment of the invention;

FIG. 2 is a sequence diagram schematically showing the operation of the router 100-1;

FIG. 3 is a format view showing an example of a packet used in the multicast network;

FIG. 4 is a format view showing an example of an IGMP message;

FIG. 9 is a table configuration view showing contents of a routing table (control portion) 900;

FIG. 11 is a table configuration view showing contents of a bandwidth management table 1100 on which bandwidth is recorded in accordance with each multicast group;

FIG. 12 is a table configuration view showing contents of a line bandwidth management table 1200 on which bandwidth is recorded in accordance with each line;

FIG. 13 is a table configuration view showing contents of a line container portion bandwidth management table 1300 on which bandwidth is recorded in accordance with each line container portion;

FIG. 14 is a table configuration view showing contents of a QoS bandwidth management table 1400 on which bandwidth is recorded in accordance with each queue;

FIG. 15 is a command view showing an example of commands used in the configuration of the router 100;

FIG. 17 is a flow chart schematically showing the operations of the routers 100-1 and 100-2.

DETAILED DESCRIPTION OF THE INVENTION

A) Outline

Figure 5:
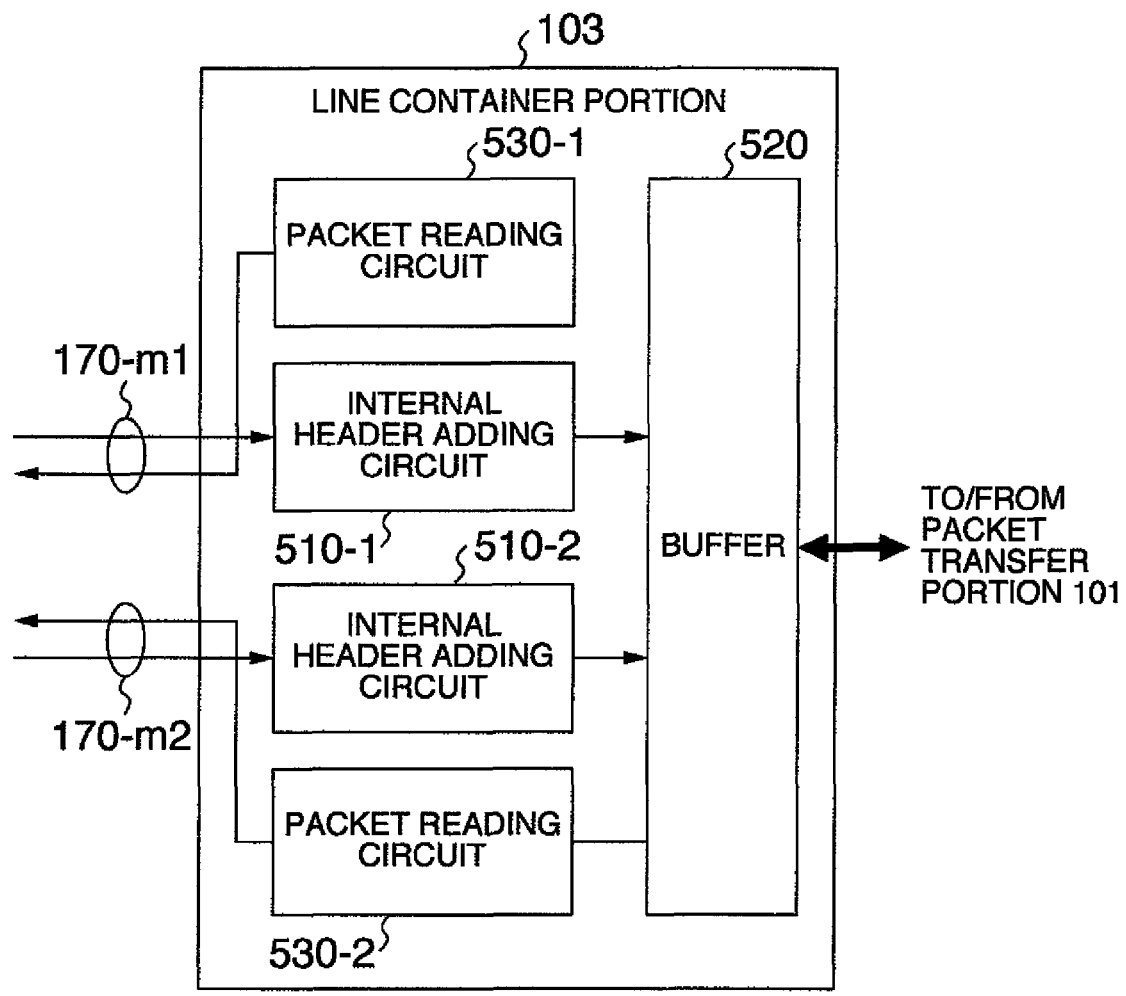
FIG. 5 is a configuration diagram of a line container portion 103.

FIG. 1 is a block diagram showing the schematic configuration of a router 100-1 and a multicast network according to an embodiment of the invention. In FIG. 1, a multicast packet distributed from a server 120 passes through a multicast network 130 including a router, etc. and is transferred to clients 150-11 to 150-n2 by routers 100-2 and 100-1. This embodiment is based on the assumption that respective apparatuses and networks support IPv4.

When a client 150-mi (m=1, 2 . . . n; i=1 or 2) connected to the router 100-1 wishes to receive multicast packets, the client 150-mi transmits an IGMP Membership Report (hereinafter referred to as 'IGMP Report') (which is a client-router message used in an IPv4 network for joining a multicast group) to the upstream router 100-1. Upon reception of the IGMP Report, the router 100-1 transmits a PIM Join (which is a router-router message used in the IPv4 network for joining a multicast group) to the upstream router 100-2 nearer to the server 120 and registers a backward route opposite to the joining message receiving route as a multicast packet transfer route. The upstream router 100-2 and further upstream routers perform the same operation, so that the multicast packet transfer route from the server 120 to the client 150-mi is created. Then, the router 100-1 having the multicast packet distributed from the server 120 and received from the upstream router 100-2 transfers the multicast packet to the reception-wanting client 150-mi in accordance with the registered transfer route.

Accordingly, only after the router 100-1 receives the IGMP Report, the router 100-1 starts transfer of the multicast packet distributed from the server 120 and starts transfer of the multicast packet to the client 150 which transmitted the IGMP Report. As described above, in multicast communication, only when there is a joining message from a client, a multicast packet transfer route is registered and the multicast packet is transferred.

Incidentally, when there is reception of an IGMP Leave Group (hereinafter referred to as 'IGMP Leave') (which is a message indicating disjoining from the multicast group) from the client, the registered transfer route is deleted so that the multicast packet transfer is stopped.

The router 100-1 includes: line container portions 102 and 103 which contain lines 160-1 and 170-mi (m=1, 2 . . . n; i=1 or 2) for connection to other apparatuses; a packet transfer portion 101 which determines an output destination of the packet based on the address of the packet and transfers the packet to a corresponding line container portion 102 or 103; and a control portion 104 which controls processing of a routing protocol and the whole of the router 100-1. The router 100-1 is connected to multicast packet receiving clients 150-mi by lines 170-mi connected to line container portions 103. The router 100-1 is further connected to the router 100-2 located on the upstream side of the multicast network, by the line 160-1 connected to the line container portion 102. Incidentally, the router 100-2 has the same internal configuration as the router 100-1 except that the router 100-2 receives a PIM message as a multicast group joining/disjoining message from the router 100-1.

FIG. 2 is a sequence diagram schematically showing the operation of the router 100-1. When there is no IGMP Report (which is a massage for joining the multicast group) from all the clients 150-*mi*, the router 100-1 stands by while the packet transfer portion 101 is kept in a power saving state (sequence 201). The term 'power saving state' means a state in which the clock frequency and voltage required for LSI driving are dropped while the packet transfer portion 101 holds only performance necessary for transferring reception-schedule control packets, etc.

Then, when a client 150-*mi* wishes reception of a multicast packet, the client 150-*mi* transmits an IGMP Report to the router 100-1 (sequence 202). Upon reception of the IGMP Report from the client 150-*mi*, the router 100-1 cancels the power-saving state of the packet transfer portion 101 and increases the clock frequency and voltage of the LSI to increase transfer performance (sequence 203). Successively, the router 100-1 transmits a PIM Join (which is a router-router message for joining) to the upstream router 100-2 (sequence 204). Successively, the upstream router 100-2 transmits the PIM Join to the multicast network 130 in a hop-by-hop manner (sequence 205).

When the PIM Join is propagated in the multicast network, the router 100-1 and other routers start transfer of the multicast packet so that the packet is delivered to the client 150-*mi* (sequence 206, 207 and 208).

When the router 100-1 receives an IGMP Report from another client 150-*mi*, the router 100-1 increases transfer performance stepwise in accordance with the number of received IGMP Report messages (sequence 209 and 210).

Although description has been made in the case where transfer performance of the router 100-1 is increased, transfer performance of the router 100-2 is increased stepwise in accordance with the number of PIM Join messages. When each router 100 receives an IGMP Leave (which is a message indicating disjoining from the multicast group) or the like, transfer performance of the router 100 is decreased.

FIG. 17 is a flow chart schematically showing the operation of each of the routers 100-1 and 100-2. When the router 100 receives a multicast group joining/disjoining message (step 1701), the control portion 104 counts the number of received joining messages and calculates transfer performance required for the packet transfer portion 101 based on the counted reception number (step 1702). The reception number is a value which is increased by reception of a joining message and which is decreased by reception of a disjoining message. The reception number is managed by the control portion 104. In the router 100, since the number of destinations of the multicast packet is decided based on the reception number, transfer performance required for the packet transfer portion 101 is calculated based on the reception number.

Then, the control portion 104 controls transfer performance of the packet transfer portion 101 based on the transfer performance calculated in the step 1702 (step 1703) and the packet transfer portion 101 increases its own transfer performance (step 1704) or decreases its own transfer performance (step 1706) by changing the clock frequency and voltage of the LSI. Incidentally, when there is no change in the transfer performance calculated by the control portion 104, the transfer performance is kept (step 1705).

A specific example of the processing described with reference to FIG. 17 will be described later in C) transfer performance control method.

Multicast communication is different from unicast communication as follows. Because multicast transfer is not performed before a router receives a multicast group joining message, there is no fear about packet loss etc. in multicast communication even when the router is in a power saving state (in which it is impossible to receive any joining message). In addition, it is easy to predict the amount of traffic because predetermined contents are often distributed as multicast traffic of video distribution or the like and the amount of produced traffic is proportional to the number of multicast packets to be transferred (the number of received multicast group joining messages). In this embodiment, while attention is paid to such characteristic of multicast communication, transfer performance can be controlled in accordance with the number of received multicast group joining messages (the reception number) to achieve control of transfer performance of the router and reduction in power consumption of the router in accordance with the amount of multicast traffic.

B) IGMP Message Reception Process and Packet Transfer Process

An IGMP message reception process and a packet transfer process in this embodiment will be described next following the operation of the router 100-1. The two messages IGMP Report and IGMP Leave are generically called 'IGMP messages'.

FIG. 3 is a format diagram of a packet transmitted/received by the router 100-1. This packet format includes: an Ethernet header portion 310 for storing a destination, etc. in a link layer; an IP header portion 320 for storing a destination, etc. in a network layer; and data 330 for storing session information and application data.

The Ethernet header portion 310 includes a destination MAC address 311, a sender MAC address 312, a VLAN ID 313 defined by IEEE 802.1Q, and a type 314. The destination MAC address 311 and the sender MAC address 312 are information indicating a destination and a sender in a data link layer. The VLAN ID 313 is used when a plurality of logical networks are superposed on a single physical network. A number identifying a protocol stored in the payload 315 is written in the type 314. For example, when the protocol is IP (Internet Protocol), "800 (hexadecimal)" is stored in the payload 315. When a port-base VLAN is used or when VLAN is not used, the VLAN ID 313 is not added.

The IP header portion 320 includes: a sender IP address 321 indicating a sender in a network layer; a destination IP address 322 indicating a destination in the network layer; and a protocol 323 indicating a number identifying a protocol stored in the data 330. The router 100-1 determines a line for outputting the packet by referring to the destination IP address 322 of the received packet.

An IGMP message indicating joining/disjoining of a client 150-*mi* to/from the multicast group, contents transmitted from the distribution server 120, etc. are stored in the data 330.

Operation in the IGMP message reception process of the router 100-1 and the internal structure of the router 100-1 will be described next. The router 100-1 receives the IGMP Report transmitted from the client 150-*mi*, from the line container portion 103-*m* through the line 170-*mi*.

Figure 6:
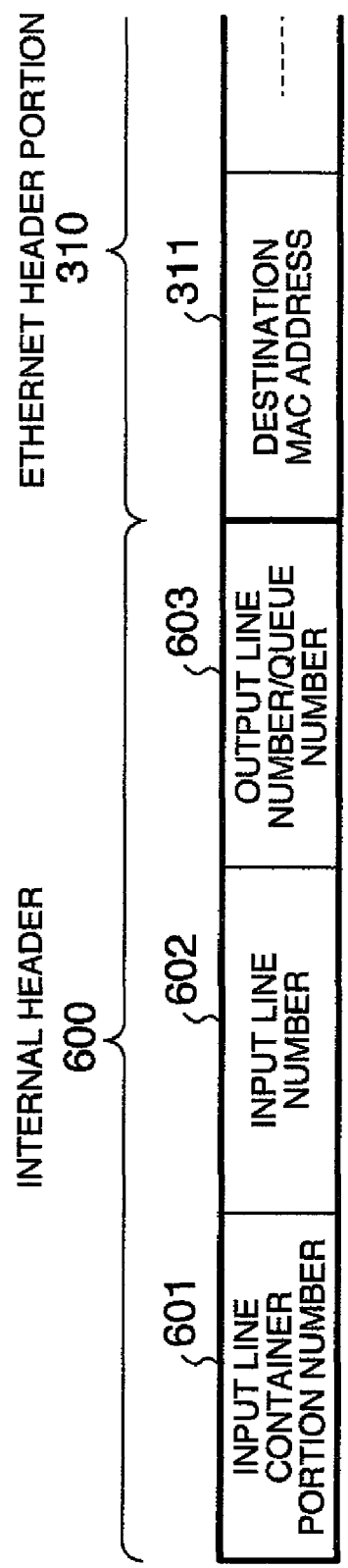
FIG. 6 is a format view showing an example of header information used in the inside of the router 100-1.

FIG. 5 is a diagram showing the internal configuration of the line container portion 103-*m*. The line container portion 103-*m* includes: internal header adding circuit 510-1 and 510-2; a buffer 520 for temporarily storing the packet; and packet reading circuits 530-1 and 530-2 which read the packet queued in the buffer 520 at the time of packet transmission and output the packet to the line 170-*mi*. Upon reception of the packet through the line 170-*mi*, each internal header adding circuit 510 adds an internal header 600 (FIG. 6) to the top of the received packet. The internal header 600 is a header which will be used in the inside of the router 100-1 at the time of packet transfer.

Respective fields in the internal header 600 will be described here. Information for identifying the line container portion 103 having the received packet is recorded as an input line container portion number 601. This information is used in the packet transfer portion 101. Similarly, information for identifying the line 170 used for receiving the packet is recorded as an input line number 602 and used in the packet transfer portion 101. The output destination line number and output queue number (queue number for controlling packet output sequence) of the reception packet determined in the packet transfer portion 101 are recorded as output line number/queue number 603.

When the internal header 600 is added by the internal header adding circuit 510, appropriate values are written in the input line container portion number 601 and the input line number 602 but there is no value written in the output line number/queue number 603.

Figure 7:
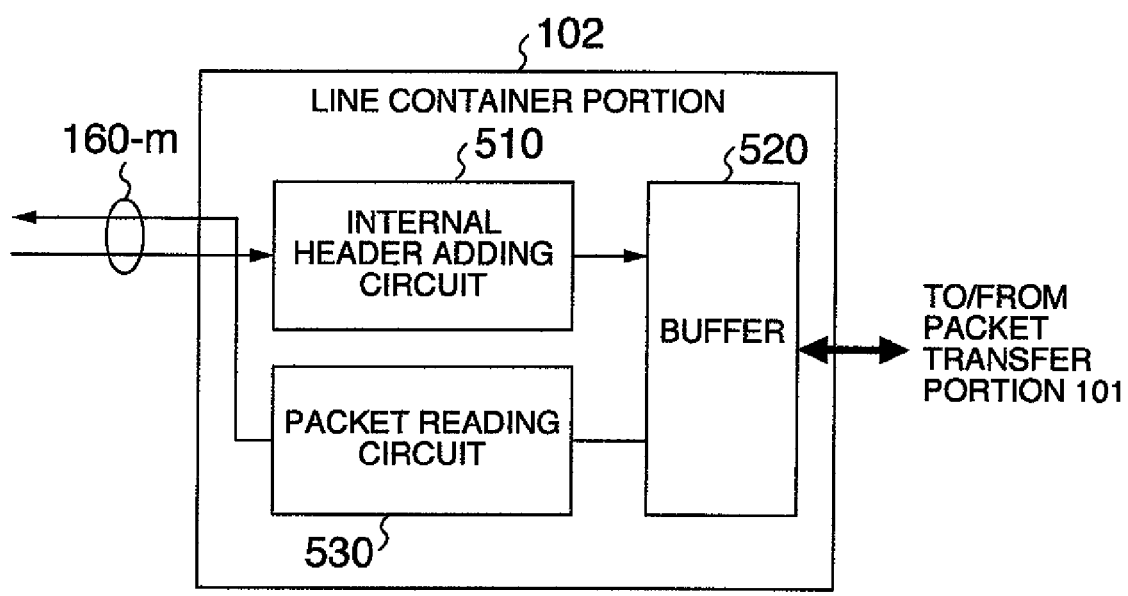
FIG. 7 is a configuration diagram of a line container portion 102.

FIG. 7 is a diagram showing the internal configuration of the line container portion 102. Because the inside of the line container portion 102 has the same structure and function as the line container portion 103-*m*, description thereof will be omitted.

After the internal header 600 is added to the received packet by the internal header adding circuit 510, the received packet is stored in the buffer 520. The packet stored in the buffer 520 is read out by the packet transfer portion 101.

Figure 8:
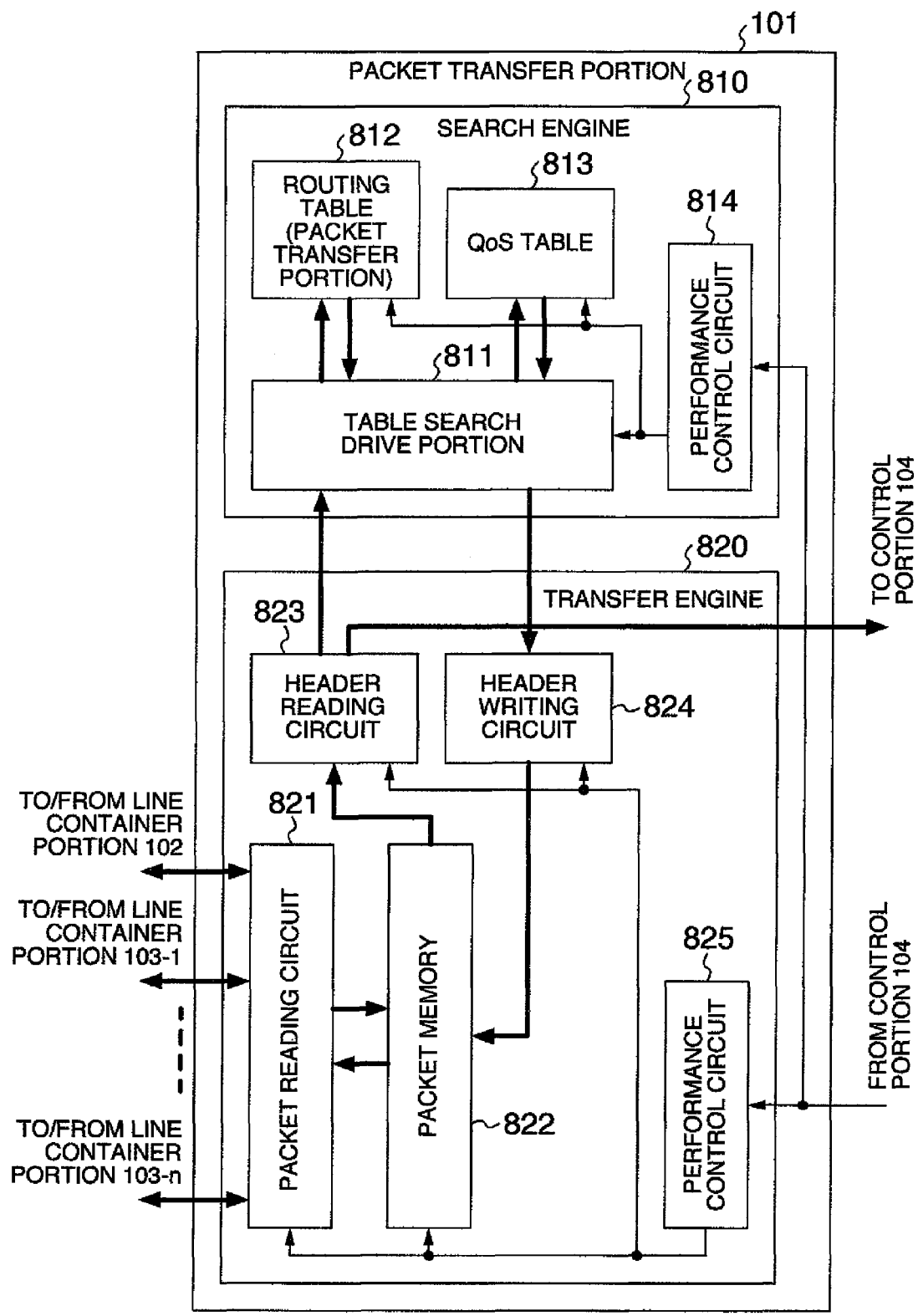
FIG. 8 is a configuration diagram of a packet transfer portion 101.

FIG. 8 is a diagram showing the internal configuration of the packet transfer portion 101. The operation of the packet transfer portion 101 will be described with reference to FIG. 8.

The packet transfer portion 101 includes two LSIs, that is, a search engine 810 and a transfer engine 820. The packet stored in the buffer 520 is read out by a packet reading circuit 821 in the transfer engine 820 and stored in a packet memory 822. When the packet is stored in the packet memory 822, a header reading circuit 823 reads the internal header 600, the Ethernet header portion 310 and the IP header portion 320 of the packet.

The header reading circuit 823 checks whether the destination IP address 322 of the read IP header portion 320 coincides with the IP address allocated to the line 170-*mi*. When the destination IP address 322 coincides with the IP address allocated to the line 170-*mi*, the packet stored in the packet memory 822 is entirely transferred to the control portion 104 because the packet is addressed to the router. For example, the case where an IGMP message etc. transmitted from the client 150-*mi* to the router 100-1 is the packet addressed to the router 100-1 corresponds to this case. On the other hand, when the destination IP address 322 does not coincide with the IP address allocated to the line 170-*mi*, the packet is transferred to a table search drive portion 811 in the search engine 810 and a next transfer destination of the packet is determined. For example, reception of a multicast packet or the like corresponds to this case.

Description will be made first in the case where the destination IP address 322 of the received packet coincides with the IP address allocated to the line 170-*mi* and an IGMP Report is contained in the data 330 of the packet.

Figure 16:
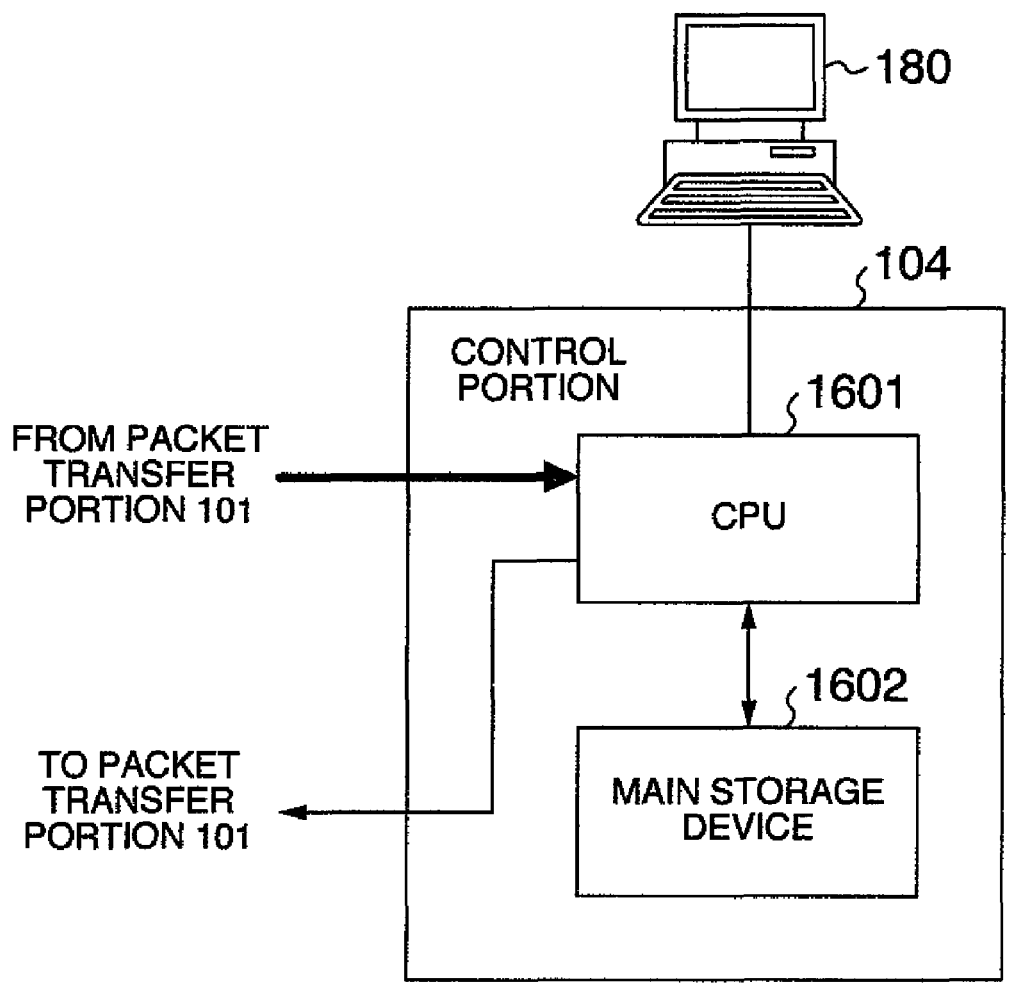
FIG. 16 is a configuration diagram of a control portion 104.

FIG. 16 is a diagram showing the internal configuration of the control portion 104. The control portion 104 includes: a CPU 1601 which is a general-purpose processor; and a main storage device 1602 in which a routing table and a bandwidth management table (which will be described later) are stored. The control portion 104 performs routing protocol processing, etc. Upon reception of the packet from the header reading circuit 823, the CPU 1601 of the control portion 104 confirms the value of the protocol 323. When the value of the protocol 323 is "2", the protocol 323 indicates that the IGMP message is contained in the data 330 of the received packet.

FIG. 4 is a view showing the format of the IGMP message. The IGMP message 410 contains a group address 411, a source address 412, and an identification bit 413. The group address of a multicast group to be joined is written in the group address 411. The address of the multicast sender (IP address of the distribution server) is written in the source address 412. The identification bit 413 is a bit indicating whether the message is a joining message or a disjoining message. The identification bit 413 of "1" indicates a joining message (IGMP Report) whereas the identification bit 413 of "0" indicates a disjoining message (IGMP Leave).

When "1" indicating a joining message is written in the identification bit 413, that is, when an IGMP Report is received, the control portion 104 extracts information necessary for transfer of the multicast packet from the IGMP message 410 and the internal header 600 and registers the extracted information in a routing table (control portion) 900 stored in the main storage device 1602 shown in FIG. 9.

FIG. 9 is a table configuration view showing contents of the routing table (control portion) 900. The routing table (control portion) 900 is a database in which addresses (transfer destinations) of received packets are written. The source address 412 in the IGMP message 410 of the received packet is registered in the sender IP address 901. The group address 411 in the IGMP message 410 of the received packet is registered in the destination IP address 902. The input line number 602 in the internal header 600 is registered in the output line number 903. When IGMP Reports for the same group address and source address are received from a plurality of lines, respective input line numbers 602 are written in the output line number 903.

The example shown in FIG. 9 indicates a state in which an IGMP Report for a multicast group with a source address "10.0.0.1" and a group address "244.0.0.1" is received from output line numbers 170-21 and 170-31. That is, when a multicast packet in which a source address "10.0.0.1" and a group address "244.0.0.1" corresponding to the sender IP address 901 and the destination IP address 902 are stored is received, a transfer route for outputting the packet to lines 170-21 and 170-31 registered as output line numbers is registered.

When an IGMP Report is received as described above, the transfer route of the multicast packet corresponding to the multicast group is registered.

On the other hand, when "0" is recorded as the identification bit 413 of the IGMP message 410, that is, when an IGMP Leave is received, the entry corresponding to the group address 411 and the source address 412 is deleted from the routing table (control portion) 900.

The router 100-1's process for transferring the multicast packet transmitted from the server 120 will be described next. The router 100-1 receives the multicast packet from the line 160-1 via the multicast network 130 and the router 100-2. The received multicast packet is stored in the packet memory 822 of the packet transfer portion via the line container portion 102 in the same manner as in the reception of the IGMP message.

The header reading circuit 823 transmits the internal header 600, the Ethernet header portion 310 and the IP header portion 320 of the packet to the table search drive portion 811 in the search engine 810. The table search drive portion 811 searches the routing table (packet transfer portion) 812 by using the sender IP address 321 and the destination IP address 322 in the IP header portion 320 as search keys. Incidentally, the routing table (packet transfer portion) 812 is a database in which the same contents as those of the routing table (control portion) 900 are stored. At the same time the control portion 104 updates the routing table (control portion) 900, the control portion 104 updates the routing table (packet transfer portion) 812 to the same contents.

The table search drive portion 811 compares a pair of the sender IP address 321 and the destination IP address 322 in the received packet with a pair of the sender IP address 901 and the destination IP address 902 in the routing table (packet transfer portion) 812 and reads the output line number 903 of the matched entry. The output line number 903 thus read is written in the output line number/queue number 603 in the internal header 600.

At the same time the table search drive portion 811 searches the routing table (packet transfer portion) 812, the table search drive portion 811 searches the QoS table 813.

Figure 10:
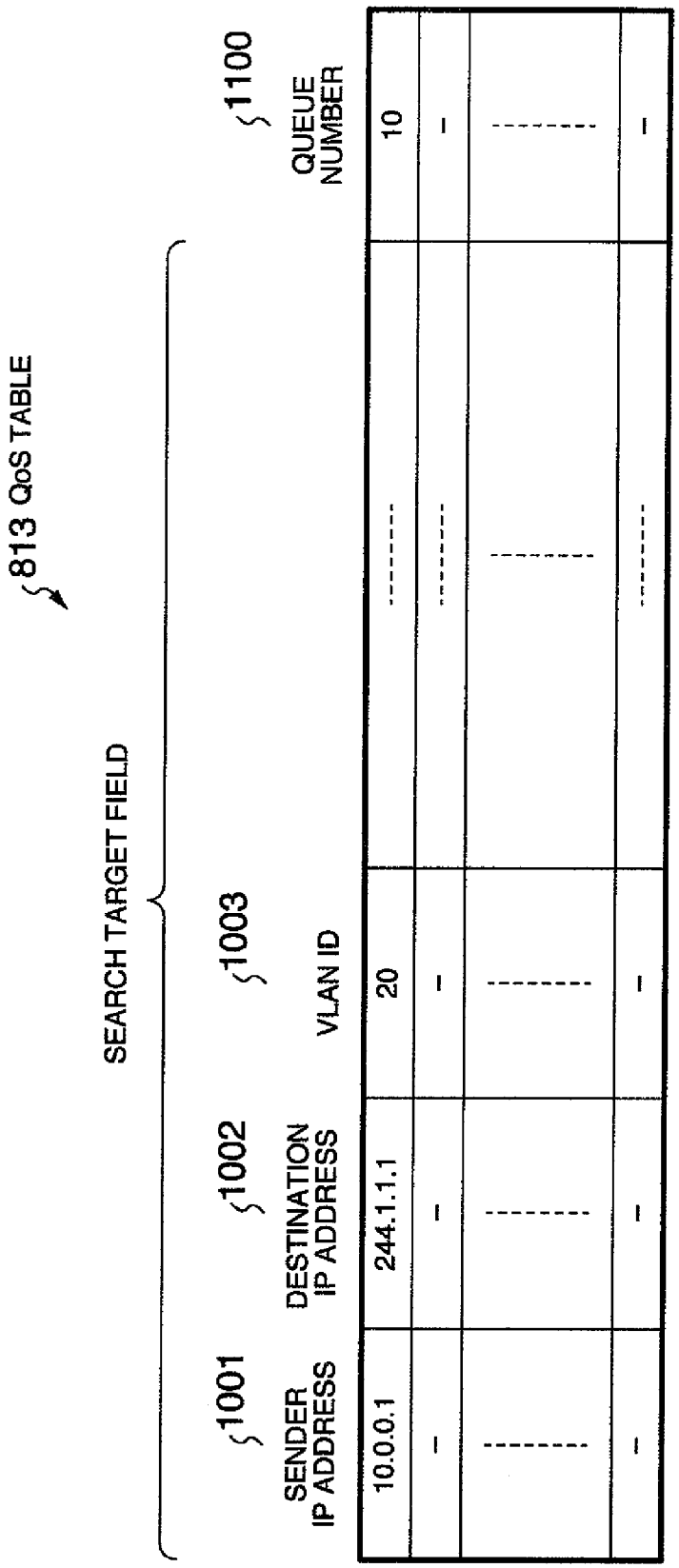
FIG. 10 is a table configuration view showing contents of a QoS table 813.

FIG. 10 is a table configuration view showing contents of the QoS table 813. The QoS table 813 is a table for determining an output queue of received packets. The QoS table 813 contains a search target field, and a queue number 1100 as a search result. The search target field contains a sender IP address 1001, a destination IP address 1002, a VLAN ID 1003, etc. Incidentally, the queue number 1100 is a number allocated to each line 170-mi or logical line (VLAN). The field of the header portion of the received packet is compared with the entry of this table, so that the matched queue number 1100 is read. Although not shown, MAC address, TCP port number, etc. are contained in the search target field. The field may be set as 'don't care' to be out of the search target. The QoS table 813 is updated by the control portion 104 in connection with a master database in the main storage device 1602 of the control portion 104. Contents of the master database are the same as those of the QoS table 813. After the CPU 1601 updates the master database, the CPU 1601 updates the QoS table 813 to the same contents as those of the master database.

The table search drive portion 811 writes a result of searching of the routing table (packet transfer portion) 812 in the output line number/queue number 603. After writing the output line number and the queue number in the output line number/queue number 603 is completed, the internal header 600 is transmitted to the header writing circuit 824 in the transfer engine 820. When there are a plurality of output line numbers as shown in the example of FIG. 9, the internal header 600 is copied, the respective output line numbers are written and the internal header 600 is transmitted to the header writing circuit 824.

Upon reception of the internal header 600, the header writing circuit 824 overwrites the updated internal header 600 on the packet in the packet memory 822. When there are a plurality of packet headers 600 transmitted, the packets in the packet memory 822 are copied and the respective internal headers 600 of the packets are overwritten.

The packet reading circuit 821 confirms the output line number written in the output line number/queue number 603 in the internal header 600 of the packet and transmits the packet to the line container portion 103 containing the line. As a result of searching of the routing table (packet transfer portion) 812 shown in FIG. 9, the packet is transferred to the line container portions 130-2 and 130-3. The packets thus transmitted are queued in a queue for each line or logical line in the buffer 520 in accordance with the queue number of the output line number/queue number 603.

The packet reading circuit 530 in the line container portion 130 reads the packets queued in the buffer 520 and outputs the packets to the lines 170-mi successively. On this occasion, an output bandwidth is determined in accordance with each queue, so that the packet is output within the determined bandwidth.

The router 100-1's operation for IGMP message reception and packet transfer has been described. The router 100-1's operation for transfer performance control in accordance with the number of received IGMP messages will be described next.

C) Transfer Performance Control Method

In this embodiment, the transfer performance of the router 100-1 increases or decreases (hereinafter referred to as 'changes') in accordance with the number of received IGMP messages to thereby achieve power saving. Upon reception of an IGMP message, the CPU 1601 in the control portion 104 registers/deletes the transfer route of the multicast packet and determines transfer performance required of the router 100-1 based on information such as the number of received IGMP messages stored in the main storage device 1602. The term 'transfer performance' means the packet processing performance of the packet transfer portion 101.

Then, the CPU 1601 instructs the packet transfer portion 101 to operate with the determined transfer performance. Specifically, the CPU 1601 transmits transfer performance control information to performance control circuits 825 and 814 in the transfer engine 820 and the search engine 810 of the packet transfer portion 101 to instruct the performance control circuits 825 and 814 to operate with the determined transfer performance. Each performance control circuit controls the clock frequency and power supply voltage of the circuit and memory in each engine based on the received transfer performance control information to change the transfer performance. Incidentally, granularity (unit) of change of transfer performance is variable. In the following, specific examples of the transfer performance control method will be described while classified in accordance with granularity (unit) of change of transfer performance.

C-1) Use Bandwidth Unit of Multicast Channel

Transfer performance control based on the use bandwidth of each multicast channel will be described first. In this control method, bandwidth information of the multicast channel used in accordance with each multicast group (a pair of group address and source address) is held in the control portion 104 so that the bandwidth information is used for transfer performance control of the packet transfer portion 101.

FIG. 11 is a table configuration view showing contents of a bandwidth management table 1100 in accordance with each multicast group which is held in the main storage device 1620 by the control portion 104. The bandwidth management table 1100 contains a source address 1101, a group address 1102, a bandwidth 1103, and the number of receivers 1104. When an IGMP Report for the source address 1101 and the group address 1102 is received, the CPU 1601 performs the aforementioned IGMP message reception process and increases the number of receivers 1104 in the bandwidth management table 1100 in accordance with the number of receptions. The bandwidth 1103 indicates a bandwidth used by the multicast packet transmitted from the server 120 for the source address 1101 and the group address 1102. The bandwidth 1103 is set in advance. The example shown in FIG. 11 indicates use of the bandwidth 50 Mbps.

The CPU 1601 calculates a product of the bandwidth 1103 and the number of receivers 1104 to obtain transfer performance required of the transfer engine 820 and the search engine 810 (in the example shown in FIG. 11, '50 Mbps as the bandwidth 1103'×'2 as the number of receivers'='100 Mbps' transfer performance). A result of the calculation is transmitted to the performance control circuits 825 and 814 to increase transfer performance of the transfer engine 820 and the search engine 810. Specifically, the performance control circuit 814 increases transfer performance of the search engine 810 by controlling the clock frequency and supply voltage fed to the table search drive portion 811, the routing table 812 and the QoS table 813 in the search engine 810. The performance control circuit 825 increases transfer performance of the transfer engine 820 by controlling the clock frequency and supply voltage fed to the packet reading circuit 821, the packet memory 822, the header reading circuit 823 and the header writing circuit 824 in the transfer engine 820.

Only one multicast group entry is shown in the example of FIG. 11. When there are a plurality of multicast group entries, the aforementioned product is calculated in accordance with each entry and the sum of calculation results of all the entries is calculated as transfer performance.

When IGMP Leave indicating disjoining from a multicast group is received, the number of receivers 1104 for the entry is reduced and transfer performances required of the transfer engine 820 and the search engine 810 are re-calculated by the same method as described above and transmitted to the performance control circuits 825 and 814 to thereby reduce transfer performance.

By the aforementioned processing, transfer performance of the packet transfer portion 101 can be changed meticulously in accordance with the number of multicast receivers and the bandwidth used for the multicast group to thereby achieve power saving. When the number of multicast receptions is "0", the packet transfer portion 101 goes to a power saving state. However, there is no packet loss because multicast packet reception and transfer is not performed. Even when the number of multicast receptions is "1" or more, the bandwidth used for the multicast group may be set in the bandwidth 1103 in accordance with multicast contents distributed from the server. In this case, if multicast traffic (contents) distributed from the server uses the predetermined bandwidth, multicast packet transfer can be performed without packet loss in the router 100-1.

C-2) Physical Line Speed (Line Bandwidth) Unit

When transfer performance is changed in accordance with reception of each IGMP message by the method C-1), there is fear that transfer performance may change frequently if a plurality of clients 150 are connected to the line 170 via Ethernet switches or the like. When the router 100-1 receives traffic over the bandwidth set in the bandwidth management table, there is fear that packet loss may occur.

Therefore, transfer performance of the packet transfer portion in the router 100-1 may be changed based on the speeds (line bandwidths) of the physical lines 160 and 170-*mi* in order to prevent frequent change of transfer performance and packet loss. This method will be described with reference to FIG. 12.

FIG. 12 is a table configuration view showing contents of a line bandwidth management table 1200. The line bandwidth management table 1200 is a database table which is stored in the main storage device 1602 of the control portion 104 and on which correspondence of line bandwidths to the respective line numbers of the lines 160 and 170-*mi* is recorded. Any one of values 160 and 170-11 to 170-*n*2 is recorded as each line number. Each line bandwidth is recorded in terms of Mbps. For example, '1000' is recorded as the line bandwidth for the line 170-21 of 1000BASE-SX. The example shown in FIG. 12 indicates that the maximum bandwidths of the lines 170-21 and 170-31 are 1000 Mbps respectively.

Upon reception of an IGMP Report, the CPU 1601 of the control portion 104 of the router 100-1 retrieves line numbers 1201 from the line bandwidth management table 1200 in the main storage device 1602 by using the value of the input line number 602 in the internal header 600 as a key. When the number of receptions 1203 changes from "0" to "1" as a result of addition (which will be described later) of the number of receptions 1203 with respect to the matched entry, the bandwidth 1202 is further read. For example, when "170-21" is stored as the input line number 602, "1000" stored as the bandwidth 1202 of the entry "1" is read because "170-21" coincides with the line number 1201 of the entry "1".

Successively, the CPU 1601 issues an instruction to the performance control circuits 825 and 814 to improve transfer performance of 1000 Mbps which is the maximum bandwidth of the line. Upon reception of the instruction, each of the performance control circuits 825 and 814 increases transfer performance by controlling the clock frequency and supply voltage of the circuit and memory in each engine.

Addition of the number of receptions 1203 will be described. Upon reception of an IGMP Report, the CPU 1601 adds "1" to the value of the number of receptions 1203 in the line bandwidth management table 1200. The number of receptions 1203 is a field for recording whether the IGMP Report has been received from the line designated by the line number 1201 of the entry. When "1" or more is recorded in the number of receptions 1203, the number of receptions 1203 indicates that the IGMP Report has been received. When "0" is recorded in the number of receptions 1203, the number of receptions 1203 indicates that the IGMP Report has been not received or the IGMP Report was received but an IGMP Leave has been received. That is, when the number of receptions 1203 is "0", there is no multicast packet transfer to the client connected to the line. When the number of receptions 1203 is "1" or more, multicast packet transfer is being performed.

In this method, when the number of receptions 1203 changes from "0" to "1" (multicast packet transfer to at least one client is being performed), transfer performance is improved to the maximum bandwidth of the line for multicast packet transfer regardless of the amount of traffic of the multicast packet. Accordingly, when "1" or more has been recorded in the number of receptions 1203, the CPU 1601 does not issue a transfer performance improving instruction to the performance control circuits 825 and 814 anymore even if an IGMP Report is then received.

When an IGMP Leave is received so that the number of receptions 1203 changes to "0", the CPU 1601 transmits the value stored in the bandwidth 1202 as a transfer performance decreasing instruction to the performance control circuits 825 and 814.

When transfer performance is improved by the bandwidth of the line at the time of reception of the first IGMP Report as described above, the server does not transfer the multicast packet to the client over the line bandwidth even when the server transmits the multicast packet by using the bandwidth over the predetermined bandwidth. Accordingly, packet loss can be avoided. When the number of receivers is "1" or more, transfer performance of the packet transfer portion 101 is set based on the bandwidth of the line. Accordingly, frequent change of transfer performance can be avoided.

C-3) Line Container Portion Unit

The rooter 100-1 may change transfer performance in accordance with the bandwidth of all the lines contained in the line container portion (102 or 103-1 . . . n) instead of change of transfer performance in accordance with the line bandwidth described in C-2). This method will be described with reference to FIG. 13.

FIG. 13 is a table configuration view showing contents of a line container portion bandwidth management table 1300. The line container portion bandwidth management table 1300 is a database table which is stored in the main storage device 1602 and on which correspondence of the bandwidth (the sum of bandwidths of lines contained) of the line container portion 103 or 102 to the number (102 or 103-1 . . . n) of the line container portion is recorded.

Any one of values 102 and 103-1 to 103-n is recorded as the line container portion number 1301 on the table. The line bandwidth is recorded in terms of Mbps. For example, in FIG. 13, the line container portion 103-2 contains lines with a line bandwidth of 2000 Mbps.

The difference of this method from C-2) Line Bandwidth Unit is in that the number of received IGMP Reports is managed separately in accordance with the line container potions 102 and 103 so that transfer performance can be improved with respect to the total bandwidth of lines contained in each line container portion when the number of received messages is at least "1". Upon reception of an IGMP Report, the CPU 1601 in the control portion 104 retrieves the line container portion number 1301 on the line container portion bandwidth management table 1300 by using the value of the input line container portion number 601 in the internal header 600 as a key. When the number of receptions 1303 changes from "0" to "1" as a result of addition (which will be described later) of the number of receptions 1303 in the matched entry, the CPU 1601 further reads the bandwidth 1302. For example, when "103-3" is stored in the input line container portion number 601, the CPU 1601 reads "2000" stored in the bandwidth 1302 of the entry "2" because "103-3" matches with the line container portion number 1301 of the entry "2".

Successively, the CPU 1601 issues an instruction to the performance control circuits 825 and 814 to improve transfer performance of 2000 Mbps which is the total maximum bandwidth of lines contained in the line container portion. Upon reception of the instruction, each of the performance control circuits 825 and 814 increases transfer performance by controlling the clock frequency and supply voltage of the circuit and memory in each engine.

Addition of the number of receptions 1303 will be described here. Upon reception of an IGMP Report, the CPU 1601 adds "1" to the value of the number of receptions 1303 on the line container portion bandwidth management table 1300. The number of receptions 1303 is a field for recording the number of IGMP Reports received from lines contained in the line container portion number 1301 of the entry. When "1" or more is recorded as the number of receptions 1303, the number of receptions 1303 indicates that the IGMP Report has been received. When "0" is recorded as the number of receptions 1303, the number of receptions 1303 indicates that there is no IGMP Report received or the IGMP Report was received but an IGMP Leave has been received. That is, when the number of receptions 1303 is "0", the number of receptions 1303 indicates that multicast packet transfer is not being performed through the line container portion. When the number of receptions 1303 is "1" or more, the number of receptions 1303 indicates that multicast packet transfer is being performed.

In this method, when the number of receptions 1303 changes from "0" to "1" (when there is multicast packet transfer through the line container portion), transfer performance is improved for the total bandwidth of lines contained in the line container portion subjected to multicast packet transfer regardless of the amount of multicast packet traffic. Accordingly, when "1" or more has been recorded as the number of receptions 1303, the CPU 1601 does not issue the transfer performance improving instruction to the performance control circuits 825 and 814 anymore even if an IGMP Report is then received.

When an IGMP Leave is received so that the number of receptions 1303 changes to "0", the CPU 1601 transmits the value stored in the bandwidth 1302 as a transfer performance reducing instruction to the performance control circuits 825 and 814.

As described above, the router 100-1 improves transfer performance for the total bandwidth of lines contained in the line container portion at the time of reception of the first IGMP Report to thereby avoid packet loss in the same manner as in C-2). In addition, frequent change of transfer performance can be avoided compared with C-2.

C-4) Bandwidth Unit Set by Queue

Transfer performance control of the router 100-1 in the case where IGMP Reports are received from physical lines has been described above. Transfer performance control of the router 100-1 in the case where IGMP Reports are received from logical lines (VLAN) will be described here.

Upon reception of an IGMP Report from a logical line (VLAN), the CPU 1601 in the control portion 104 searches the master database of the QoS table 813 (FIG. 10) in the main storage device 1602 by using the VLAN ID 313 in the Ethernet header portion 310 as a key. The CPU 1601 reads the queue number 1100 of the entry having the value of the VLAN ID 313 coincident with the value of the VLAN ID 1003. The CPU 1601 searches the QoS bandwidth management table 1400 by using the read queue number as a key.

FIG. 14 is a table configuration view showing contents of the QoS bandwidth management table 1400. The QoS bandwidth management table 1400 contains a queue number 1401 to be retrieved, a bandwidth 1402 determined to be obeyed in accordance with the queue number of VLAN used for packet transfer control, and the number of receptions 1403 indicating the number of IGMP Reports received from VLAN or the like corresponding to the queue number.

The CPU 1601 reads the bandwidth 1402 of the entry having the queue number 1401 coincident with the queue number read from the master database of the QoS table 813. On this occasion, the CPU 1601 adds "1" to the value of the number of receptions 1403 when an IGMP Report is received, and the CPU 1601 subtracts "1" from the value of the number of receptions 1403 when an IGMP Leave is received. For example, in FIG. 14, when the queue number read from the master database is 10, the CPU 1601 reads "20" as the bandwidth 1402 of the entry "1". The bandwidth 1402 is recorded in terms of Mbps.

Successively, the CPU 1601 issues a transfer performance improving instruction to the performance control circuits 825 and 814 based on the read information of the bandwidth 1402. Upon reception of the instruction, each of the performance control circuits 825 and 814 increases transfer performance by controlling the clock frequency and supply voltage of the circuit and memory in each engine. Incidentally, in this method, when the number of receptions 1403 changes from "0" to "1" (when there is multicast packet transfer using the VLAN queue), transfer performance is improved for the bandwidth determined in the VLAN queue regardless of the amount of multicast packet traffic in the same manner as in C-2 and C-3.

According to this method, the router 100-1 can change transfer performance of the packet transfer portion 101 based on the bandwidth determined in accordance with each queue in the VLAN. Because the packet reading circuit 530 in each of the line container portions 102 and 103 reads packets based on the bandwidth set in accordance with each queue, multicast packet abortion can be avoided if the packet transfer portion 101 has transfer performance corresponding to the bandwidth.

C-5) Statistic Information

The router 100-1 can change transfer performance of the packet transfer portion 101 in accordance with the amount of multicast packet traffic which flowed in the past. In this method, the router 100-1 is designed so that the search engine 810 or the transfer engine 820 measures the number of transmitted/received multicast packets and bandwidth information (bps) in accordance with a flow (a combination of the sender IP address and the destination IP address etc.) and records a result of the measurement on the main storage device 1602 of the control portion 104. When an IGMP message matched with the measured flow is received, transfer performance of the packet transfer portion can be changed based on bandwidth information or the like which is the flow statistic information. In this case, for example, the number of received IGMP messages is counted in accordance with the flow and a product of the number of receptions and the bandwidth information as the flow statistic information is calculated so that transfer performance can be calculated.

C-6) Others

Although the behavior of the router 100-1 at the time of reception of an IGMP Report in the IPv4 network has been described above, the invention can be applied to reception of MLD Join/Leave used in an IPv6 network or reception of PIM used between routers and the same effect can be obtained. For example, in the case of PIM, the router 100-2 in FIG. 1 changes transfer performance in accordance with the number of PIM messages received from the router 100-1.

To change transfer performance of the packet transfer portion 101, transfer performance may be changed with respect to either of the search engine 810 and the transfer engine 820. In this case, the performance control circuit 814 or 825 may be provided in either engine with respect to which transfer performance is changed. In addition, only part of each engine may be subjected to change of transfer performance. For example, only the table search drive portion 811 in the search engine 810 may be subjected to change of transfer performance.

D) Configuration

The configuration of the router 100 will be described finally. The administrator of the router 100 performs setting of the router 100 by using the management terminal 180 shown in FIG. 1.

FIG. 15 is a command view showing an example of commands input to the management terminal 180 to make the function of this embodiment valid.

The command 1501 in FIG. 15 is a command example for setting a power saving mode in accordance with change of the bandwidth in each multicast channel as described in C-1). The term "multicast_power saving_mode" is a command for changing the state of the router 100 to a multicast power saving mode. The following first argument "igmp" indicates that transfer performance is changed when an IGMP Report is received. The following second argument "channel_bandwidth" indicates that the bandwidth is changed in accordance with each multicast channel. Description of the same command and arguments as those of the command 1501 will be omitted hereunder.

The command 1502 in FIG. 15 is a command example for setting a power saving mode in accordance with change of the bandwidth in each IGMP reception physical line as described in C-2). The second argument "line_bandwidth" indicates that the bandwidth is changed in accordance with each physical line 170 or 160.

The command 1503 is a command example for setting a power saving mode in accordance with change of the bandwidth in each line container portion as described in C-3). The second argument "nif_bandwidth" indicates that the total bandwidth of lines contained in each line container portion 103 is changed.

The command 1504 is a command example for setting a power saving mode based on the bandwidth control information as described in C-4). The second argument "qos_bandwidth" indicates that QoS information of multicast channel or destination VLAN is used for controlling change of the bandwidth.

The command 1505 is a command example for setting a power saving mode in an IPv6 network. The first argument "mld" indicates that transfer performance is changed when MLD Report is received as a multicast client-router message used in the IPv6 network. The following second argument "channel_bandwidth" indicates that the bandwidth is changed in accordance with each multicast channel. Any other argument "line_bandwidth", "nif_bandwidth" or "qos_bandwidth" can be designated as an argument following "mld" in the same manner as in IGMP.

The command 1506 is a command example for setting a power saving mode triggered by PIM reception in a multicast routing protocol between routers. The first argument "pim" indicates that transfer performance is changed when PIM JOIN or PIM LEAVE used between routers is received. The second argument "channel_bandwidth" indicates that the bandwidth is changed in accordance with each multicast channel. Any other argument "line_bandwidth", "nif_bandwidth" or "qos_bandwidth" can be designated as an argument following "pim" in the same manner as in IGMP.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet transfer apparatus connected to a multicast packet distributing server and multicast packet receiving clients via a network, comprising:
   line container portions each of which contains lines connected to the network;
   a packet transfer portion which determines an output destination of a multicast packet received from each line and transfers the multicast packet to the output destination; and
   a control portion which controls the packet transfer apparatus; wherein
   the packet transfer portion receives multicast group joining messages via the lines and the line container portions, and sends the multicast group joining messages to the control portion,
   the control portion which counts and holds a number of the multicast group joining messages received from the packet transfer portion, the packet transfer portion stepwise increases or decreases transfer performance for transferring the multicast packet based on the number of the multicast group joining messages held by the control portion, and the control portion further holds information of bandwidth used in each multicast group of plural multicast groups; and the packet transfer portion increases or decreases transfer performance based on the number of the received multicast group joining messages held for each multicast group by the control portion and the bandwidth information.

2. A packet transfer apparatus connected to a multicast packet distributing server and multicast packet receiving clients via a network, comprising:

line container portions each of which contains lines connected to the network;

a packet transfer portion which determines an output destination of a multicast packet received from each line and transfers the multicast packet to the output destination; and a control portion which controls the packet transfer apparatus; wherein the packet transfer portion receives multicast group joining messages via the lines and the line container portions, and sends the multicast group joining messages to the control portion, the control portion which counts and holds a number of the multicast group joining messages received from the packet transfer portion, the packet transfer portion stepwise increases or decreases transfer performance for transferring the multicast packet based on the number of the multicast group joining messages held by the control portion, and wherein:

the control portion further holds information of bandwidth in each line; and the packet transfer portion increases transfer performance based on the bandwidth information of the line receiving the multicast group joining messages when the number of the received multicast group joining messages held by the control portion is 1 or more.

3. A packet transfer apparatus connected to a multicast packet distributing server and multicast packet receiving clients via a network, comprising:

line container portions each of which contains lines connected to the network;

a packet transfer portion which determines an output destination of a multicast packet received from each line and transfers the multicast packet to the output destination; and a control portion which controls the packet transfer apparatus; wherein the packet transfer portion receives multicast group joining messages via the lines and the line container portions, and sends the multicast group joining messages to the control portion, the control portion which counts and holds a number of the multicast group joining messages received from the packet transfer portion, the packet transfer portion stepwise increases or decreases transfer performance for transferring the multicast packet based on the number of the multicast group joining messages held by the control portion, and wherein:

the control portion further holds information of bandwidth in lines contained in each line container portion; and the packet transfer portion increases transfer performance based on the bandwidth information of the line container portion containing a line receiving the multicast group joining messages when the number of the received multicast group joining messages held by the control portion is 1 or more.

4. A packet transfer apparatus connected to a multicast packet distributing server and multicast packet receiving clients via a network, comprising:

line container portions each of which contains lines connected to the network;

a packet transfer portion which determines an output destination of a multicast packet received from each line and transfers the multicast packet to the output destination; and a control portion which controls the packet transfer apparatus; wherein the packet transfer portion receives multicast group joining messages via the lines and the line container portions, and sends the multicast group joining messages to the control portion, the control portion which counts and holds a number of the multicast group joining messages received from the packet transfer portion, the packet transfer portion stepwise increases or decreases transfer performance for transferring the multicast packet based on the number of the multicast group joining messages held by the control portion, and wherein:

each line container portion has queues for queuing packets to be transmitted;

the control portion further holds information of bandwidth set in accordance with each queue; and the packet transfer portion increases transfer performance based on the bandwidth information set in the queue storing a multicast packet to be transferred after reception of the multicast group joining messages when the number of receptions held by the control portion is 1 or more.

5. A packet transfer apparatus according to claim 1, wherein each multicast group joining message is a message transmitted from any one of the clients or from another packet transfer apparatus connected via the network.

6. A packet transfer apparatus according to claim 1, wherein the number of the received multicast group joining messages is counted and held so that the control portion adds 1 when a multicast group joining message is received but subtracts 1 when a disjoining message is received.

7. A packet transfer apparatus according to claim 1, wherein the packet transfer portion has a search engine for determining the output destination of the received multicast packet, and a transfer engine for transferring the multicast packet based on the output destination, and the packet transfer portion increases or decreases transfer performance by controlling performance of at least one of the search engine and the transfer engine.

8. A packet transfer apparatus connected to a multicast packet distributing server and multicast packet receiving clients via a network, comprising:

line container portions each of which contains lines connected to the network;

a packet transfer portion which determines an output destination of a multicast packet received from each line and transfers the multicast packet to the output destination; and a control portion which controls the packet transfer apparatus; wherein the packet transfer portion receives multicast group joining messages via the lines and the line container portions, and sends the multicast group joining messages to the control portion, the control portion which counts and holds a number of the multicast group joining messages received from the packet transfer portion, the packet transfer portion stepwise increases or decreases transfer performance for transferring the multicast packet based on the number of the multicast group joining messages held by the control portion, and the control portion further holds statistic information of bandwidth used in each packet flow; and the packet transfer portion increases or decreases transfer performance based on the number of received multicast group joining messages held for each packet flow by the control portion and the statistic information of the packet flow matched with the received multicast group joining messages.

* * * * *